H. D. CHURCH.
MOTOR VEHICLE.
APPLICATION FILED MAY 14, 1913.
1,228,533.
Patented June 5, 1917.
2 SHEETS—SHEET 1.
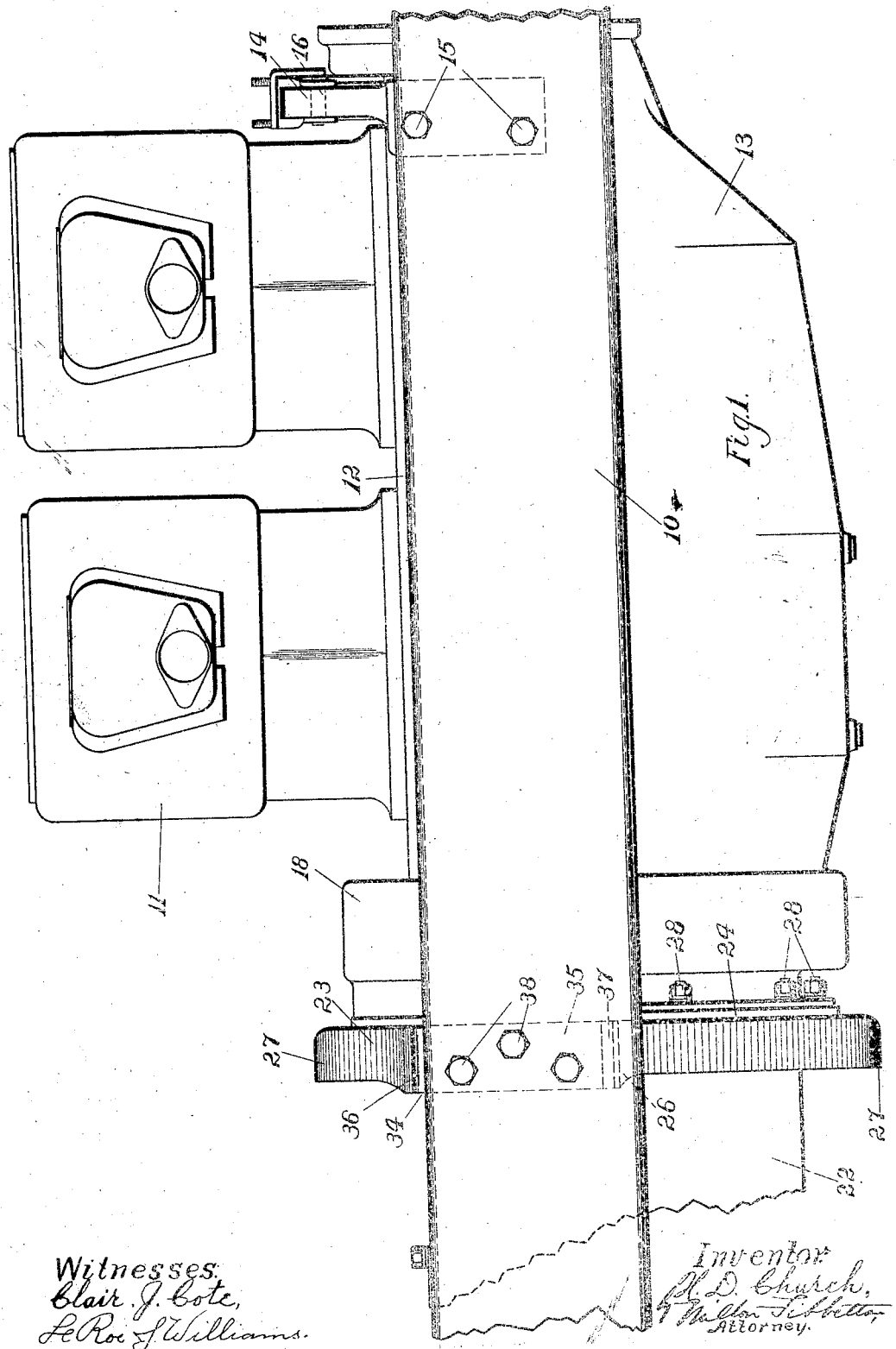

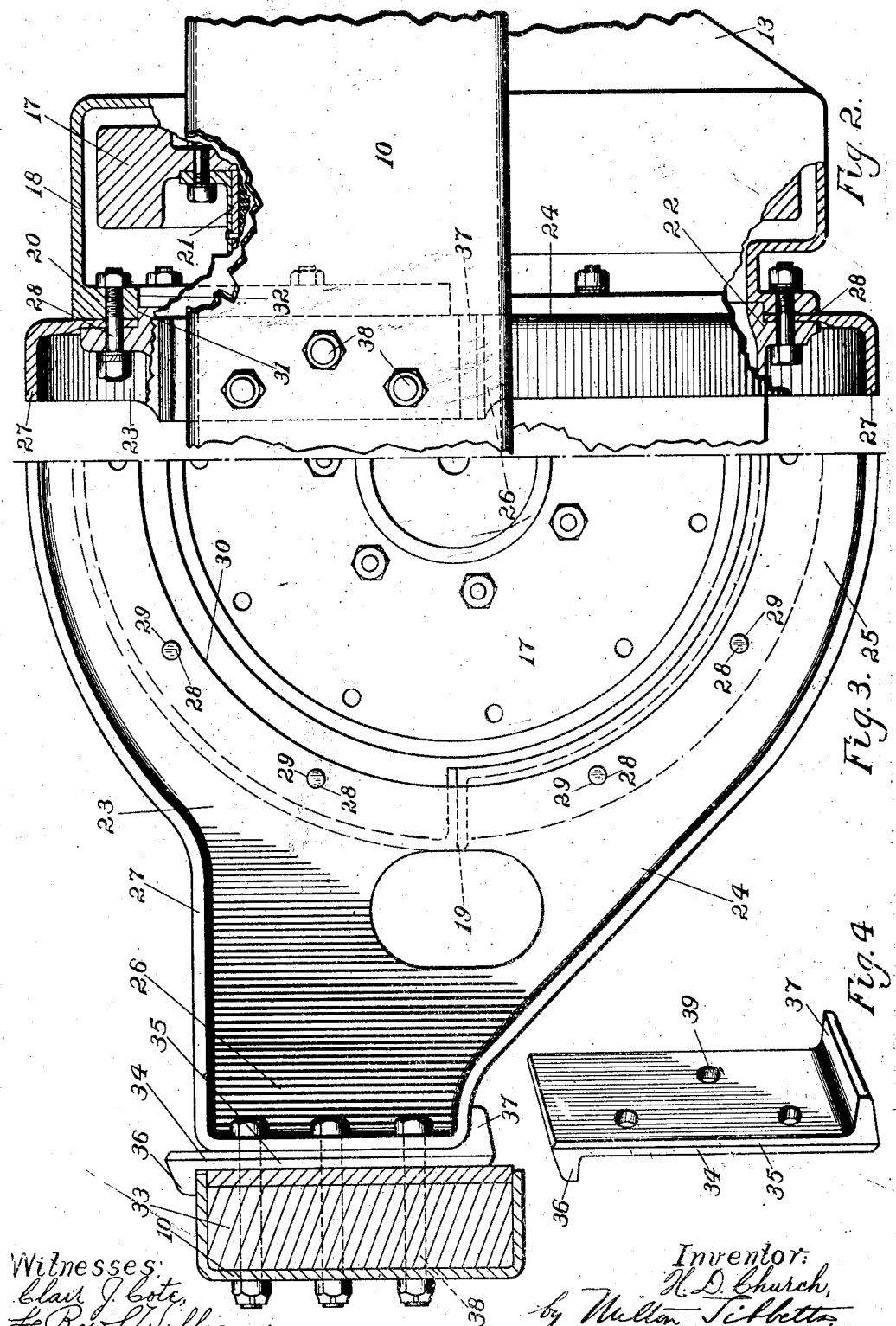

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,228,533.

Specification of Letters Patent.

Patented June 5, 1917.

Application filed May 14, 1913. Serial No. 767,6...

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to the means for supporting the motor in the frame.

One of the objects of the present invention is to support one end of the motor of a motor vehicle from the side members of the frame through a cross member that passes above and below the line of the crank shaft of the motor and is secured to the motor at several well separated points. As shown, this supporting cross member is in the form of a steel stamping having a plate portion and a flange around its entire edge, the plate portion being enlarged at the center and being secured to the motor base, and the flange having means for bolting or otherwise rigidly securing it to the frame side members.

Another object of the invention is to provide a novel form of bracket between one of the arms of the motor base and the frame side member for securing the motor base arm to the frame side member.

Other objects of the invention will be apparent from the following description, taken in connection with the drawings which form a part of this specification, and in which, Figure 1 is a side elevation of the forward part of a motor vehicle, showing the motor and contiguous parts of the frame;

Fig. 2 is an enlarged side view of the rear end of the motor and its associated supporting members, parts being cut away to show interior construction;

Fig. 3 is a rear end view of the left half of the motor and its supporting cross member, the frame side member also being shown in cross section; and Fig. 4 is a perspective view of a bracket.

Referring to the drawings, 10 represents one of the side members of a motor vehicle frame which is adapted to support a motor 11. This motor is shown as of the four cylinder hydrocarbon type, having a base or crank case 12, the bottom cover 13 of which is removably secured to the upper half. The forward end of the motor is supported from the frame side members 10 by means of a cross beam 14 which rests upon the side members 10 and is bolted thereto, as at 15. At the center of the cross beam 14 the forward end of the motor base is pivoted, as by the pivot pin 16, so that by this construction, the frame side members 10 may move slightly relatively to each other without straining the motor base.

At the rear end of the motor is mounted the fly wheel 17, shown in Fig. 2, and the motor base or crank case 12 is enlarged at this point, as shown at 18, to surround and house the fly wheel. As this crank case is divided substantially along the dotted line 19, shown in Fig. 3, the bottom cover may be dropped for the purpose of giving access to the fly wheel, and the enlargement 18 may thereby be formed with an inturned flange 20, which is substantially circular, since it follows the general outline of the fly wheel.

To the rear face of the fly wheel 17 is secured the usual clutch 21 which is adapted to connect the fly wheel, and thereby the motor crank shaft, with the driving shaft and driving gears of the vehicle. A casing forming a continuation of the motor base incloses the clutch and driving gears and is mounted immediately in the rear of the enlargement 18, being indicated in the drawings at 22. In Fig. 3, the casing and clutch are removed to make the other parts of the construction clearer.

For convenience the casing 22 will in this application be termed a clutch casing. Its forward end is circular in form and is faced off to correspond to the flange 20 of the enlargement 18, and it is adapted to be secured to this flange.

The rear end of the motor and the overhanging clutch casing which is secured to the rear end of the motor base, are adapted to be supported from the vehicle frame side members through a supporting cross member 23, which is preferably a steel stamping, and is formed of a plate portion 24, enlarged at its central part, as at 25, and having arms 26 extending at either side of said enlarged portion. The entire edge of this cross member is formed with an integral flange 27 for the purpose of strengthening the part and for securing it to the frame side members.

The enlarged plate portion of this cross member is faced off on both sides, so that it forms a liner or disk between the flange 20 of the motor base and the forward end of the clutch casing 22. These two latter parts are then bolted together, as by bolts 28, which also pass through opening 29 in the plate portion 24 of the cross member, thereby securing the gear casing to the motor base and both of these members to the cross member. For the purpose of suitably positioning the parts, the cross member is formed with a central opening 30, and encircles and fits upon a cylindrical extension 31 of the casing 22, which latter extension fits into the cylindrical opening 32, forming the inner edge of the flange 20.

One of the frame side members 10 is shown in Fig. 3 as of channel cross section. It is provided with a filler block 33, and a bracket 34 has a plate portion 35, an integral flange 36 at its upper edge which rests upon the frame 10, and an integral flange 37 at its lower edge, upon which the supporting arm 26 of the cross members 23 rests. Bolts 38 pass through the flange 27 at the end of the arm 26, through openings 39 in the bracket 34, and through the block 33 and the frame side member 10, thereby rigidly securing the arm of the motor base to the frame side member.

It will be understood that there is a certain amount of flexibility in the arm 26 and in the frame side member 10, which permits a certain amount of weaving of the frame and arm without causing undue strain on the motor base, this being assisted also by reason of the three point suspension of the motor, the third point being at the pivot bolt 16.

A specific embodiment of the invention has been described in detail, and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination with the frame side members, of a motor comprising a base having a part inclosing and extending beyond the fly-wheel, a casing member forming a continuation of said base, a supporting cross member arranged between said extended part of the base and said casing member, and means for securing said base and casing member to the supporting member.

2. In a motor vehicle, the combination with the frame side members, of a motor having a base enlarged at the fly wheel end, a cross member secured to the frame side members and having an enlarged central portion, means for securing said enlarged central portion to the enlarged portion of said motor base, and means for supporting the other end of said motor.

3. In a motor vehicle, the combination with the frame side members, of a motor, a clutch casing, a cross member secured to the frame side members and passing between said motor and clutch casing, and means extending from the motor to the clutch casing for securing the motor, clutch casing and cross member together.

4. In a motor vehicle, the combination with a motor having a base enlarged at the fly wheel end thereof, of a clutch casing, a supporting member arranged between the enlarged part of the motor base and the clutch casing, and means extending from the motor to the clutch casing for securing the motor base and clutch casing to the supporting member.

5. In a motor vehicle, the combination with the motor having a base enlarged at the fly wheel end, of a clutch casing having an enlarged part adjacent the enlarged part of said base, a supporting member having a disk part arranged between and forming a liner for said enlarged base part and said clutch casing, and bolts securing the parts together.

6. In a motor vehicle, the combination with a motor having the base enlarged at the fly wheel end, said enlarged part being of cylindrical form and open at its rear end, a clutch casing adapted to be connected to the rear end of said enlarged part and having its front end open to communicate with the interior of said enlarged part of the motor base, and a supporting member having a central enlarged part in the form of a disk or washer arranged between the adjacent parts of the motor base and clutch casing, and means for connecting the motor base and clutch casing together and to said supporting member.

7. In a motor vehicle, the combination with the frame, of a motor having a supporting arm, a bracket having a plate portion arranged between the end of said arm and said frame and having an integral flange at its upper edge resting on the top of said frame and an integral flange at its lower edge upon which said motor arm rests, and bolts extending from said motor arm through said bracket and frame for securing the arm to the frame.

8. In a motor vehicle, the combination with the frame side members, of a motor, a cross member in the form of a plate having a transverse flange around its entire edge, means for securing the plate portion of said cross member to the motor, and means for securing the flange of said cross member to the frame side members.

9. In a motor vehicle, the combination with the frame side members, of a motor having a base enlarged at the fly wheel end, a supporting cross member in the form of a plate having an enlarged central portion secured to the enlarged part of said base and having laterally extending arms, said cross member being formed with a flange around its entire edge, and means for securing the flange at the ends of said arms to said side members.

10. In a motor vehicle, the combination with the frame side members, of a motor comprising a base having a casing part inclosing and extending beyond the flywheel, a casing member forming a continuation of said base, a supporting cross member secured to the side members and encircling one of said casing parts adjacent the joint between the motor base and said casing member, and means for securing said motor base and casing member to the supporting member.

11. In a motor vehicle, the combination with the frame side members, of a motor comprising a base having a casing part, a clutch casing joined thereto, a supporting cross member secured to the frame side members and encircling one of said casing members adjacent the joint between them, and means for securing said casing members to the supporting member.

12. In a motor vehicle, the combination with the frame side members, of a motor comprising a base having a casing part enlarged at the flywheel end and having a flange, a casing member having a flange and making a joint with the enlarged casing part of said motor base, a cross member encircling one of said casing parts adjacent said joint, and means for securing said cross member to said flanges.

In testimony whereof I affix my signature in the presence of two witnesses.

HAROLD D. CHURCH.

Witnesses:
C. E. BROAD,
LE ROI J. WILLIAMS.